United States Patent
Tannenbaum (10) Patent No.: US 7,305,627 B2
(45) Date of Patent: Dec. 4, 2007

(54) APPARATUS AND METHOD FOR CORRECTING PREVIOUSLY SENT MESSAGES IN A REAL-TIME MESSAGING SYSTEM

(75) Inventor: Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/405,404

(22) Filed: Apr. 1, 2003

(65) Prior Publication Data
US 2005/0278413 A1    Dec. 15, 2005

(51) Int. Cl.
G06F 3/00    (2006.01)
(52) U.S. Cl. ..................................... 715/751
(58) Field of Classification Search ............... 715/772, 715/751
See application file for complete search history.

(56) References Cited

U.S. PATENT DOCUMENTS

| | | | |
|---|---|---|---|
| 4,641,309 A | 2/1987 | Nakano et al. | |
| 4,646,250 A | 2/1987 | Childress | |
| 5,353,259 A | 10/1994 | Howes et al. | |
| 5,481,597 A | 1/1996 | Given | |
| 5,809,112 A | 9/1998 | Ryan | |
| 5,832,221 A | 11/1998 | Jones | |
| 5,870,548 A | 2/1999 | Nielsen | |
| 5,909,667 A | 6/1999 | Leontiades et al. | |
| 5,966,351 A | 10/1999 | Carleton et al. | |
| 6,023,779 A | 2/2000 | Fullam et al. | |
| 6,047,315 A | 4/2000 | Tsuji et al. | |

(Continued)

FOREIGN PATENT DOCUMENTS

JP    2001202320 A    4/2001

OTHER PUBLICATIONS

Screen Dumps of Microsoft Outlook 2000 (pp. 1-2, 1999).*

(Continued)

*Primary Examiner*—Kristine Kincaid
*Assistant Examiner*—Le Nguyen
(74) *Attorney, Agent, or Firm*—Duke W. Yee; Jeffrey S. LaBaw; Wayne P. Bailey (57) ABSTRACT

An apparatus and method for correcting previously sent messages in a real-time messaging system are provided. With the apparatus and method of the present invention, when a user of an instant messaging client transmits an instant message to another instant messaging client, the user may notice that the message just sent includes an error requiring correction. As a result, the user may activate a correction mechanism of the present invention to correct the instant message previously sent. The activation of the correction mechanism initiates the sending of a control message to the instant messaging client that received the previous instant message or a selected message from an instant message log. This control message is used to generate a notification at the receiving instant messaging client that the sending instant messaging client is in the process of correcting a message. Once the user has completed the corrections to the previously sent instant message, the user may select to send the corrected instant message to the previous recipient of the instant message. At the receiving instant messaging client, the instant message is displayed in the instant messaging log with identifiers indicating that the message is a corrected message and conspicuously displaying the corrected text.

30 Claims, 5 Drawing Sheets

U.S. PATENT DOCUMENTS

| | | |
|---|---|---|
| 6,052,812 A | 4/2000 | Chen et al. |
| 6,310,694 B1 | 10/2001 | Okimoto et al. |
| 6,430,604 B1 | 8/2002 | Ogle et al. |
| 2002/0087634 A1 | 7/2002 | Ogle et al. |
| 2002/0194278 A1* | 12/2002 | Golan ........................ 709/206 |
| 2004/0162877 A1* | 8/2004 | Van Dok et al. ............ 709/204 |

OTHER PUBLICATIONS

U.S. Appl. No. 10/042,668, Vincent, Method for User-Specified Error Correction in an Instant Messaging System, filed Jan. 8, 2002.

* cited by examiner

APPARATUS AND METHOD FOR CORRECTING PREVIOUSLY SENT MESSAGES IN A REAL-TIME MESSAGING SYSTEM

RELATED APPLICATION

The present invention is related to the subject matter of commonly assigned and co-pending U.S. patent application Ser. No. 10/042,668 filed on Jan. 8, 2002 and hereby incorporated by reference.

BACKGROUND OF THE INVENTION

1. Technical Field

The present invention is generally directed to the field of instant messaging. More specifically, the present invention is directed to an apparatus and method for correcting previously sent messages in a real-time messaging system.

2. Description of Related Art

Instant messaging has become an integral part of collaboration within engineering and business organizations. Within many businesses, instant messaging has become a mission-critical application, vital to quickly forming and coordinating task-oriented teams across geographical and organizational boundaries.

In discussions conducted over instant messaging systems (such as Lotus Sametime, AOL Instant Messenger, etc.) users tend to compose short messages, dispatch them immediately, then notice the spelling and grammatical errors, omissions, and other errors that they have typed. By the time these errors are noticed, the message has already been sent and displayed to one or more other parties, and it is too late to correct the original. Common practice is to send a new message clarifying the original, erroneous messages.

Furthermore, on the receiving side, the user of a computing device to which the instant message is sent may begin responding to a received instant message while the sender is trying to correct the mistake noticed after the sending of the message. Thus, a confusing series of instant messages may be passed between instant messaging parties because the receiving party is not aware that the sending party is attempting to correct his/her mistake in the previously sent message. Furthermore, any saved transcript of the instant messaging conversation would be confusing when read at a later time.

Thus, there is a need for an apparatus and method that permits correction of a previously sent instant message as well as informing of the receiving party that such correction is taking place.

SUMMARY OF THE INVENTION

The present invention provides an apparatus and method for correcting previously sent messages in a real-time messaging system. With the apparatus and method of the present invention, when a user of an instant messaging client transmits an instant message to another instant messaging client, the user may notice that the message just sent includes an error requiring correction. As a result, the user may activate a correction mechanism of the present invention to correct the instant message previously sent. The activation of the correction mechanism initiates the sending of a control message to the instant messaging client that received the previous instant message, or that received a selected message from an instant message log. This control message is used to generate a notification at the receiving instant messaging client that the sending instant messaging client is in the process of correcting a message.

The correction mechanism of the present invention may be activated by the selection of a graphical user interface element, such as a virtual button, pull down menu selection, or the like. Alternatively, the correction mechanism of the present invention may be activated by the manipulation of an input device associated with the instant messaging client. For example, a key on a keyboard, pointing device button, or the like may be mapped to a command to activate the correction mechanism of the present invention.

The notification that the user of the sending instant messaging client is in the process of correcting the message may take any of a plurality of different forms. For example, a graphical and/or textual alert message may be displayed on the receiving instant messaging client, an audio alert may be provided, or the like.

When the user of the sending instant messaging client selects a message or otherwise activates the correction mechanism of the present invention, an interface is provided in which the selected message, or the previously sent message, is displayed along with a parser for correcting the displayed message. The user may then make use of one or more input devices, such as a keyboard and/or pointing device, to correct the displayed message. The corrections to the message may be displayed in a conspicuous manner so that it is easier to identify the changes made. For example, the changes may be displayed in a different font, different color, with highlighting, larger size, or any other manner for distinguishing the corrected text from the original text remaining in the corrected message.

Once the user has completed the corrections to the previously sent instant message, the user may select to send the corrected instant message to the previous recipient of the instant message. At the receiving instant messaging client, the instant message is displayed in the instant messaging log with identifiers indicating that the message is a corrected message and conspicuously displaying the corrected text.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides an apparatus and method for correcting previously sent messages in a real-time messaging system, such as an instant messaging system. As is known in the art, instant messaging is typically performed in distributed computing environments in which an instant messaging client application exists on at least two computing devices that communicate with one another by way of at least one network. Therefore, in order to provide a context in which the present invention may be implemented, the following description of a distributed computing environment is provided.

Figure 1:
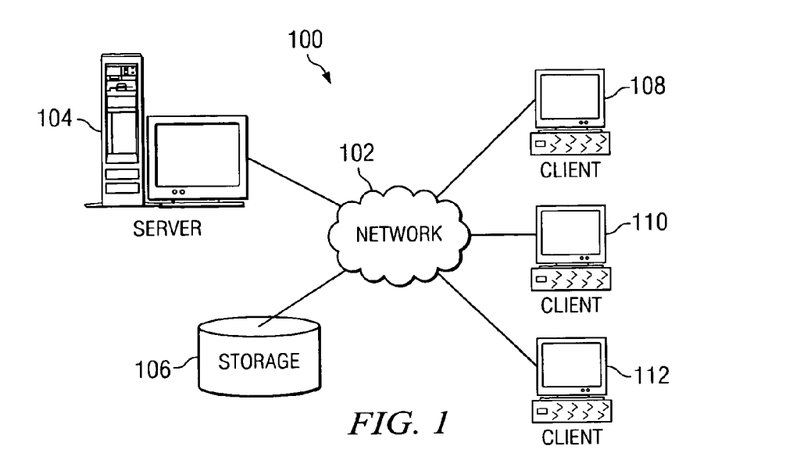
FIG. 1 is an exemplary diagram illustrating a distributed computing system in which the instant messaging system according to the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
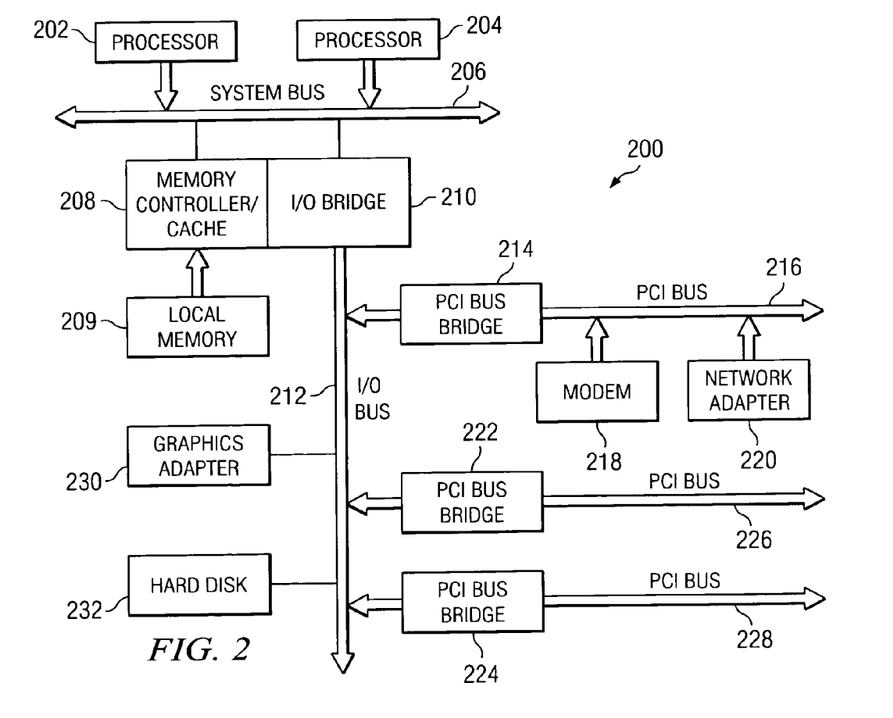
FIG. 2 is an exemplary block diagram of a server apparatus that may be used as an instant messaging server in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
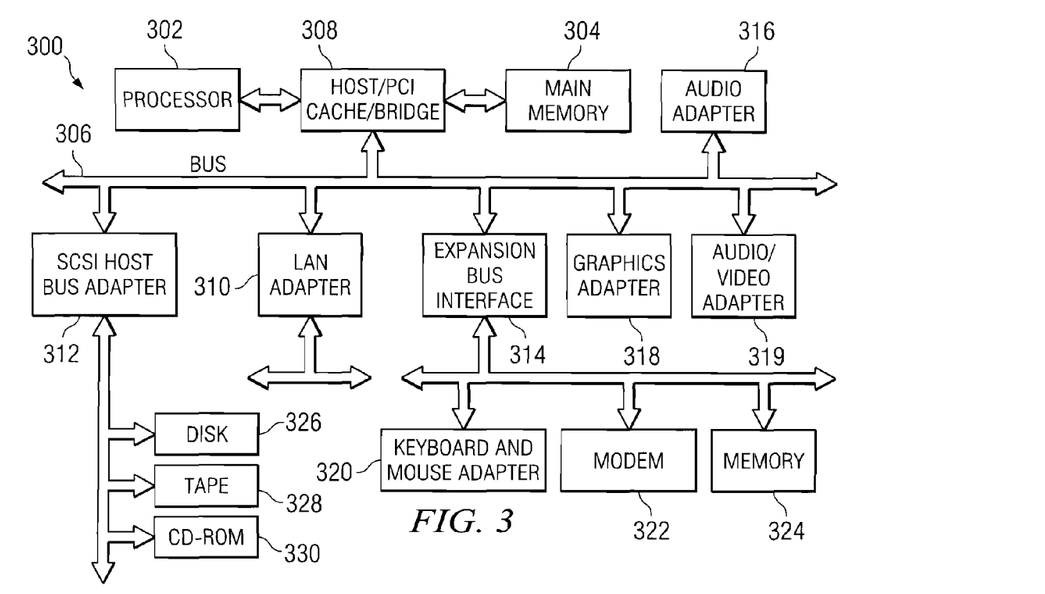
FIG. 3 is an exemplary block diagram of a client device that may be used as an instant messaging client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for correcting previously sent messages in a real-time messaging system. In such a real-time messaging system, such as an instant messaging system, an instant messaging server is provided for coordinating the routing of instant messages between instant messaging clients. For example, server 104 may operate as an instant messaging server for client devices 108, 110 and 112 which each are equipped with instant messaging client applications. The client devices 108, 110 and 112 with instant messaging client applications will be referred to herein as instant messaging clients.

Popular instant messaging systems display a running log of all instant messages sent and received in a particular conversation. Participants in a conversation typically run instant messaging clients, such as client devices 108, 110 and 112, which are often connected via an instant messaging server, such as server 104. When a user dispatches a message, the server 104 routes it to recipients as a protocol message entity. A preferred embodiment of the present invention introduces new protocol entities, a message correction protocol entity and a correction in progress entity.

It should be noted that, while the preferred embodiments of the present invention will be described with regard to personal computers being the instant messaging client devices, any type of computing device that is capable of running an instant messaging client application may be used without departing from the spirit and scope of the present invention. Examples of such computing devices include, but is not limited to, personal digital assistants, laptop computers, network computers, wireless telephones, pager devices, and the like.

In known instant messaging systems, the only mechanism for correcting a previously sent instant message is for the user of the sending instant messaging client to retype the entire message or a portion thereof. Thus, the correction takes the form of a new instant message entered by the user without any conspicuous identification of the correction being made or notification to the receiving instant messaging client that corrections are in progress.

Figure 4:
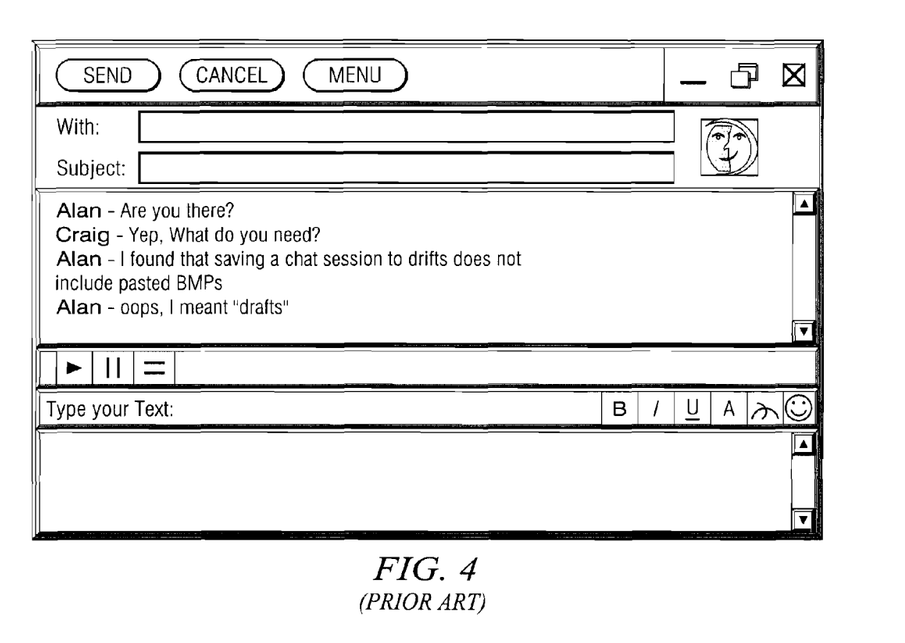
FIG. 4 is an exemplary diagram illustrating a prior art mechanism for correcting previously sent instant messages.

FIG. 4 is an exemplary diagram illustrating the prior art mechanism for correcting a previously sent instant message. As shown in FIG. 4, a first user, Alan, sends an instant message to a second user, Craig, that includes a typographical error "drifts." After having sent the instant message with the error to Craig, Alan notices the typographical error and chooses to correct the mistake. However, at no time is Craig aware that Alan has noticed his mistake and is in the process of correcting it. Furthermore, as shown in FIG. 4, the correction takes the form of a new message "oops, I meant 'drafts'." Because this new message is not complete, Craig must refer back to the earlier sent instant message and the correction message to ascertain how the entire message was intended to read.

With the apparatus and method of the present invention, a correction mechanism is provided that alerts the recipient of the instant message that the sender is attempting to correct the already sent message and also provides a corrected message with corrections conspicuously shown in the context of the non-corrected portions of the previously sent instant message. The present invention further provides an easy to use graphical user interface by which a sending party may correct previously sent instant messages.

When a user of an instant messaging client transmits an instant message to another instant messaging client, the user may notice that the message just sent includes an error requiring correction. As a result, the user may activate a correction mechanism of the present invention to correct the instant message previously sent.

Figure 5:
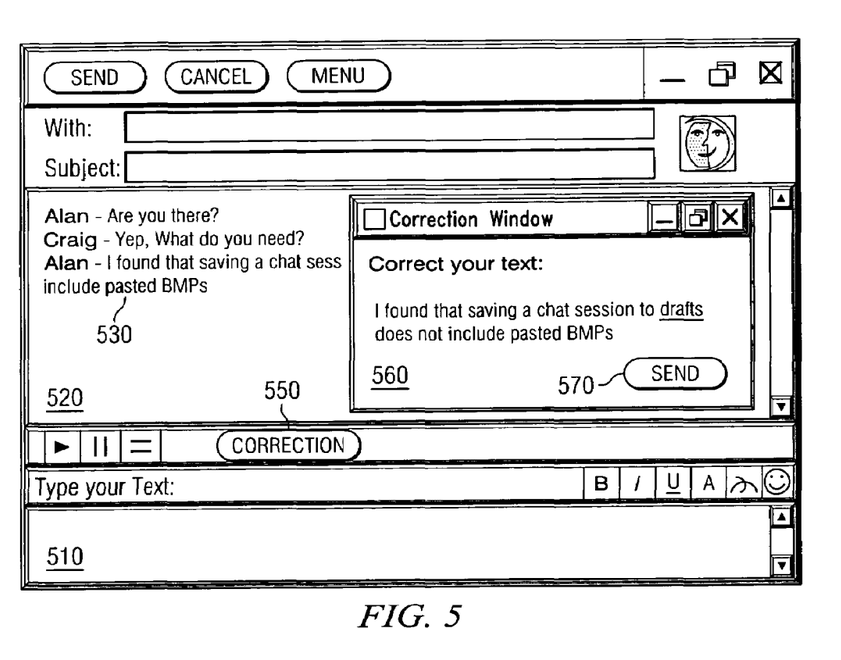
FIG. 5 is an exemplary diagram illustrating a graphical user interface for instant messaging according to one exemplary embodiment of the present invention.

For example, as shown in FIG. 5, a graphical user interface is provided having a text entry region 510 and a message log region 520. A user may enter text into the text entry region 510 and press an appropriate key on a keyboard, or the like, to have the typed in message sent to the instant messaging client recipient or recipients that previously received the uncorrected message. In addition, a copy of the entered text message is added to the message log region 520 which maintains a transcript of the text messages sent to and received from other instant messaging clients.

In the particular example shown in FIG. 5, a series of text messages have been exchanged between a user, Alan, of the instant messaging client in which the graphical user interface is implemented and another user, Craig, who has his own instant messaging client device. The last message 530 sent by Alan includes a typographical error which Alan may wish to correct. Alan may be informed of the error by viewing the message log in the message log region 520.

It should be noted that while the depicted example illustrates the last message that was sent to have the error that may be corrected, the present invention is not limited to such. Rather, any message sent by Alan may be selected from the message log and corrected using the mechanisms of the present invention. For example, if Alan is conversing with more than one other user via instant messaging, Alan may wish to select a message sent to a different party than the one to which the last message was sent.

If Alan chooses to correct the typographical error in the last message sent, or any other message selected from the message log, then Alan selects the correction virtual button 550 to activate the correction mechanism of the present invention. Alternatively, Alan may operate an input device, such as pressing a particular key on a keyboard, pressing of a button on a pointing device, or the like, to activate the correction mechanism of the present invention.

The activation of the correction mechanism by either selection of the virtual button 550 or operation of an input device causes the selected message to be displayed in a correction window 560 for editing by the user, Alan. If no message has been specifically selected from the message log region 520, it is assumed that the user intends to correct the last message sent and the last message is displayed in the correction window 560.

The user, Alan, may then edit the message displayed in the correction window 560. Edits are conspicuously shown in contrast to the non-edited portions of the message. For example, changes may be shown in a different color, different font, different size font, highlighted, underlined, or any other conspicuous manner. Once the user has completed all of the edits necessary to correct the errors in the message, the user may select the send virtual button 570 to transmit the corrected message to the original recipient of the original message. The corrected message will also be added to the message log region 520 with an indication of its "corrected" status and with the edits conspicuously shown.

In addition, with the activation of the correction mechanism of the present invention a correction notification control message is sent to the previous recipient of the selected message that is to be corrected. The correction notification control message indicates to the recipient instant messaging client that the sender of the correction notification control message is in the process of correcting a message that was sent to the recipient. In response to receiving the correction notification control message, a notification is provided to the user of the recipient instant messaging client.

Figure 6:
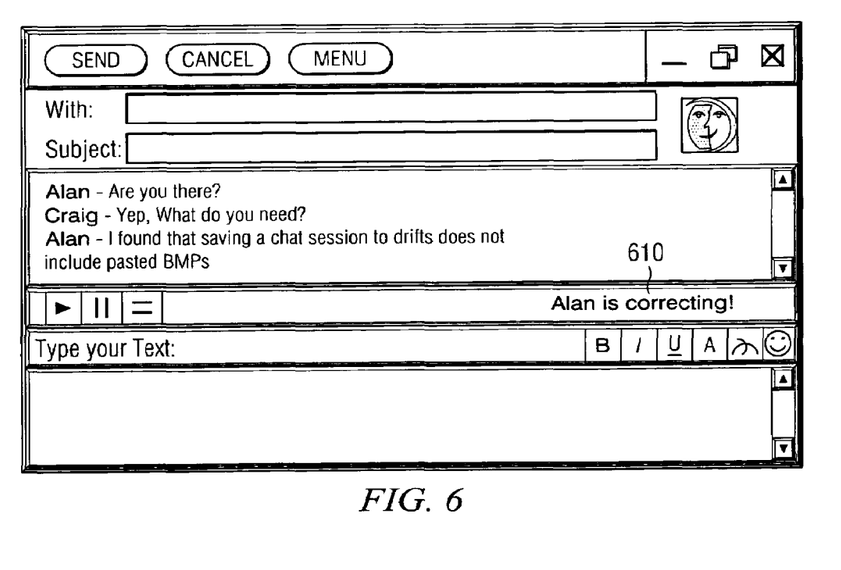
FIG. 6 is an exemplary diagram illustrating a graphical user interface for instant messaging in which a notification that a sending instant messaging client is correcting a previously sent instant message is displayed in accordance with one exemplary embodiment of the present invention.

FIG. 6 is an exemplary diagram illustrating a graphical user interface for instant messaging in which a notification that a sending instant messaging client is correcting a previously sent instant message is displayed in accordance with one exemplary embodiment of the present invention. As shown in FIG. 6, when an instant messaging client receives a correction notification control message, the instant messaging application provides the user with a notification that the sender of the correction notification control message is in the process of correcting a message that was previously sent to the instant messaging client. In the depicted example, the notification is a text message 610 that is provided in a conspicuous manner. In the depicted example, the notification message includes an identification of the sender of the correction notification control message, e.g., Alan, and the status that the sender is currently correcting a previously sent message.

While FIG. 6 illustrates the notification as a text message that is displayed to the user of a recipient instant messaging client, the present invention is not limited to such. Rather, the notification may take any of a plurality of different forms including text messages, graphical messages, audio message, or any combination of these.

The correction notification is displayed on the recipient instant messaging client graphical user interface until the corrected message is received from the sender of the correction notification control message or a correction cancelled notification message is received. When the sender of the corrected message initiates the transmission of the corrected message, the corrected message is packaged with an identifier indicating that the message is a corrected message, such as in the header information of the data packets comprising the corrected message. This indication that the message is a corrected message is used by the recipient instant messaging client along with the identification of the sender of the corrected message to determine whether to remove the notification from the graphical user interface. Furthermore, this indication of the message as a corrected message is used to determine whether to display the corrected message in the message log of the recipient instant messaging system with an identifier of the message as being a corrected message.

Figure 7:
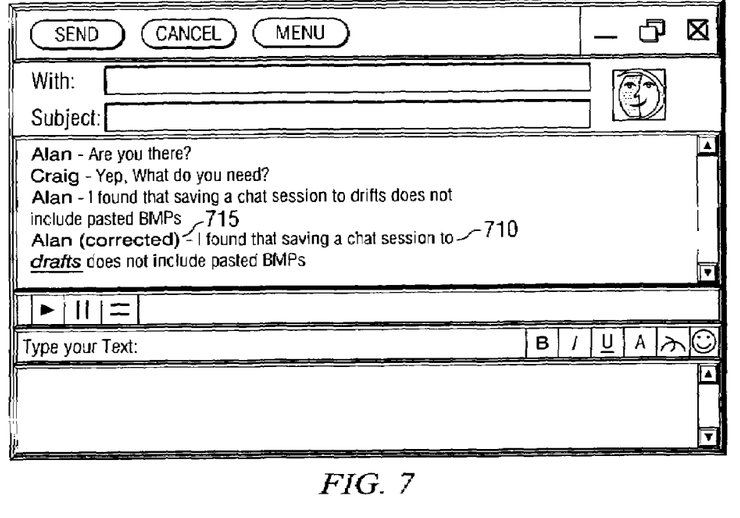
FIG. 7 is an exemplary diagram illustrating a graphical user interface for instant messaging in which a corrected message is displayed in accordance with one exemplary embodiment of the present invention.

FIG. 7 is an exemplary diagram illustrating a graphical user interface for instant messaging in which a corrected message is displayed in accordance with one exemplary embodiment of the present invention. As shown in FIG. 7, upon receipt of the corrected message from the sender of the correction notification control message, the corrected message 710 is displayed in the message log region of the recipient instant messaging client's graphical user interface. The corrected message is displayed with an identifier 715 indicating that the message is a corrected message and with the corrections conspicuously shown. In addition, the correction notification is removed.

Figure 8:
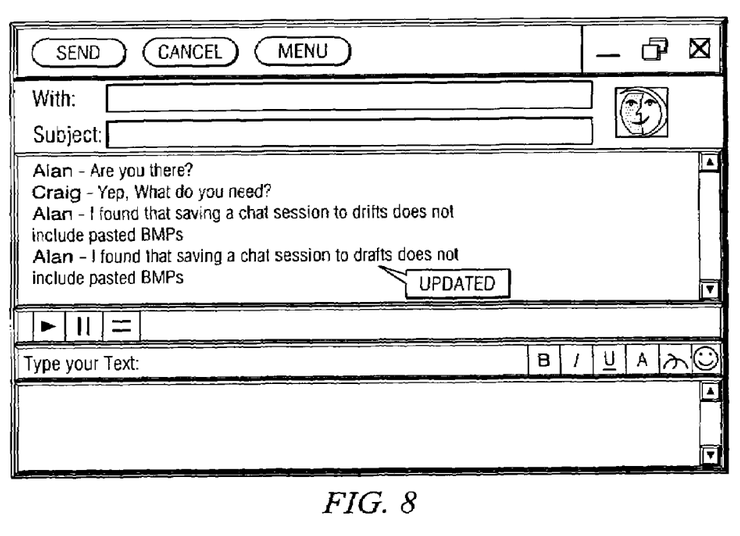
FIG. 8 is an exemplary diagram illustrating a graphical user interface for instant messaging in which a corrected message is displayed in accordance with another exemplary embodiment of the present invention.

While FIG. 7 illustrates the identifier 715 to be a parenthetical statement before the message, the present invention is not limited to such. Rather, any identifier may be used to distinguish corrected messages from other messages in the message log. For example, as shown in FIG. 8, a graphical/textual identifier box pointing to the corrected message in the message log and/or to the particular changes in the corrected message, may be used without departing from the spirit and scope of the present invention.

Thus, the present invention provides a mechanism by which instant messages may be corrected after the instant message has been sent. Furthermore, the present invention provides a mechanism for notifying a recipient of the instant message that correction is in progress. Moreover, the present invention provides a mechanism for conspicuously identifying corrected messages and the actual corrections within the messages.

Figure 9:
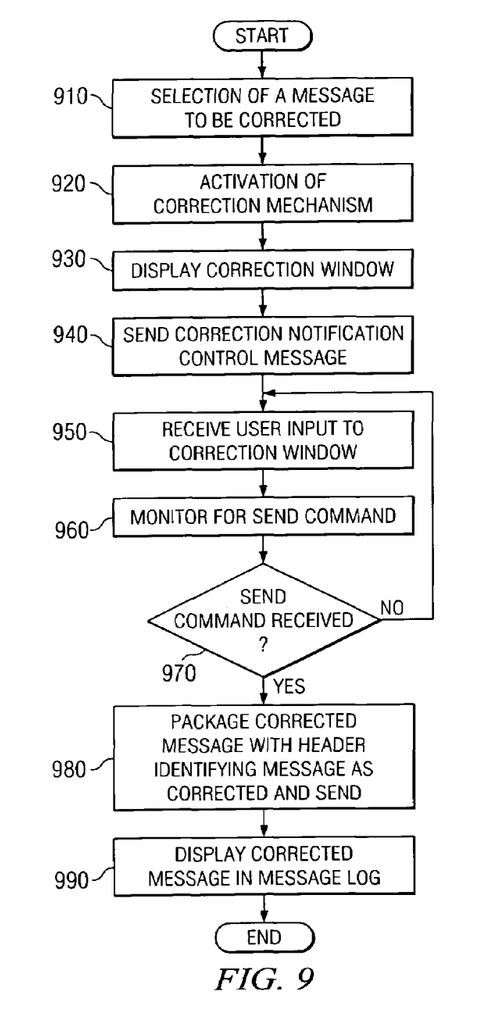
FIG. 9 is a flowchart outlining an exemplary operation of a sending instant messaging client when correcting a previously sent message in accordance with the present invention.
Figure 10:
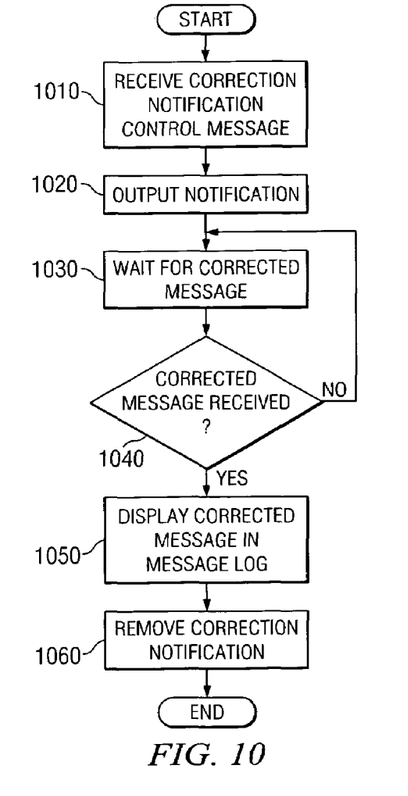
FIG. 10 is a flowchart outlining an exemplary operation of a receiving instant messaging client when a control message indicating correction is being taken place is received in accordance with the present invention.

FIGS. 9 and 10 are flowcharts that illustrate exemplary operations of a sending and receiving instant messaging client, respectively, according to exemplary embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 9 is a flowchart outlining an exemplary operation of a sender instant messaging client when correcting a previously sent message in accordance with the present invention. As shown in FIG. 9, the operation starts with the selection of a message to be corrected (step 910) and the activation of the correction mechanism (step 920). A correction window is displayed (step 930) and a correction notification control message is transmitted to the recipient of the message that is being corrected (step 940). User input to the correction window is received (step 950) and the operation monitors for the entry of a command to send the corrected message or to cancel corrections (step 960).

A determination is made as to whether a cancel command has been received (step 965). If so, then a correction cancelled notification message is sent to the recipient instant messaging client of the message that was subject to correction (step 966). If a cancel command is not received, the operation proceeds to step 970.

A determination is made as to whether a send command has been entered (step 970). If not, the operation returns to steps 950 and 960 and continues to monitor for the entry of a send command while also possibly receiving user input to the correction window. If a send command has been entered, the corrected message is packaged with header information indicating that the message is corrected and sent to the recipient of the original message (step 980). The corrected message is also displayed in the message log region of the present instant messaging client graphical user interface in a manner that conspicuously shows the message to be corrected and the corrections within the message (step 990).

FIG. 10 is a flowchart outlining an exemplary operation of a receiving instant messaging client when a control message indicating correction is being taken place is received in accordance with the present invention. As shown in FIG. 10, the operation starts with the receipt of a correction notification control message (step 1010). A notification indicating that the sender of the correction notification control message is in the process of correcting a message is output (step 1020). The operation then waits for the corrected message to be received from the sender of the correction notification control message (step 1030). It should be noted that the user of the instant messaging client that received the notification control message may continue to enter instant message text and send and receive instant messages with other instant messaging clients while awaiting the corrected message from the sender of the correction notification control message.

A determination is made as to whether the corrected message has been received (step 1040). If not, the operation returns to step 1030 and continues to wait for the corrected message. If the corrected message is received, the corrected message is displayed in the message log region of the instant messaging client graphical user interface (step 1050) with conspicuous identification of the message as a corrected message and the corrections within the message. In addition, the correction notification is removed from the graphical user interface (step 1060).

Thus, the present invention provides an easy to use interface for correcting instant messages that have already been sent. The interface provides for notification to recipients of instant messages when a sender of an instant message is in the process of correcting a previously sent instant message. Moreover, the corrected messages and the corrections within the messages are shown in a manner that makes them easy to identify in a message log.

It should be noted that many modifications to the embodiments discussed above may be made without departing from the spirit and scope of the present invention. For example, rather than providing a correction window in which the instant message is displayed for editing, the user may edit the message "in place" without the correction window. That is, the message may be edited in the message log region directly without an intermediate correction window.

In still further embodiments, rather than sending a complete copy of the previously sent instant message with corrections noted, only the corrections need be sent. At the receiving instant messaging client a message may be displayed indicating what change has been made. Such a message may take the form of "Alan has changed the word "drifts" to "drafts".

Alternatively, a personalized message may be created by the sender of the corrected message that introduces the correction that was made. An example of such a message may be "Oops! I meant "drafts"." The particular text may be entered by the user of the sending instant messaging client as a default insertion text that is attached to only the correction(s) when the user enters a command to send the corrected instant message.

In yet another embodiment of the present invention, rather than adding the corrected message to the message log on the recipient instant messaging client such that the original message is still present in the message log, the present invention may replace the original message with the corrected message. In such an embodiment, each message is provided with a unique identifier that identifies that particular message within the instant messaging session. An example of such identifiers is provided in the incorporated U.S. patent application Ser. No. 10/042,668. Based on this unique identifier, the recipient instant messaging system may identify a message in the message log and replace it with the corrected message that is received. The corrected message and the corrections within the message may still be displayed in a conspicuous manner so as to bring attention to them. These visual cues may later be removed once a sufficient period of time has elapsed for the user of the recipient instant messaging client to view the corrections.

In other embodiments of the present invention, a transcript of the instant messaging session may be saved for later use. With the present invention, an option may be provided for the instant messaging client to only store the final version of the instant messages. Thus, with such an embodiment, any corrected messages will supercede the original message in the transcript. That is, only the corrected message will appear in the transcript and the original message will not be stored in the transcript. The corrected messages may be stored with the corrections noted or in a final version where the corrections are not made conspicuous in the transcript.

Furthermore, in some embodiments, a correction to a portion of a word in the instant message will flag the entire word as having been a correction. Thus, rather than flagging individual characters in an instant message, corrections are identified on a word level. These and other modifications to the specific embodiments described above with regard to FIGS. 1-10 may be made without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a first data processing system, of correcting a previously sent instant message, comprising:
    activating a correction operation in the first data processing system by selecting the previously sent instant message from a message log and operating one of a physical and a virtual control for initiating correction of the selected previously sent instant message by opening a newly displayed correction window on a graphical user interface provided by the first data processing system, wherein the correction window has the selected previously sent instant message from the message log automatically displayed in the correction window for subsequent correction by a user of the first data processing system;
    responsive to the correction operation being activated, automatically sending a notification command to a second data processing system that was a recipient of the previously sent instant message indicating that correction of the previously sent instant message is in progress;
    receiving corrections to the previously sent instant message in the newly displayed correction window; and
    transmitting the corrections to the second data processing system.

2. The method of claim 1, further comprising:
    receiving, by the second data processing system, the notification command indicating that the user of the first data processing system is currently correcting the previously sent instant message; and
    generating a notification that alerts another user of the second data processing system that the user of the first data processing system is currently correcting the previously sent instant message, wherein when the second data processing system receives the corrections, the alert is discontinued.

3. The method of claim 2, wherein the notification includes at least one of textual output, graphical output, and audio output.

4. The method of claim 1, wherein transmitting the corrections to the second data processing system includes transmitting a corrected version of the previously sent instant message that includes the corrections depicted in a different manner from non-corrected portions of the previously sent instant message.

5. The method of claim 4, further comprising:
    storing a copy of the corrected version of the previously sent instant message in a message log; and
    displaying the corrected version of the previously sent instant message in a message log portion of a graphical user interface.

6. The method of claim 1, wherein receiving corrections to the previously sent instant message includes receiving edits to the copy of the previously sent instant message from the user of the first data processing system, wherein the edits are depicted in a different manner than non-edited portion of the copy of the previously sent instant message in the correction window.

7. The method of claim 1, wherein transmitting the corrections to the second data processing system includes:
    receiving a selection of a send virtual button in the correction window; and
    transmitting at least one of the corrections only and a corrected version of the previously sent instant message with the corrections depicted in a different manner from non-corrected portions of the previously sent instant message.

8. The method of claim 2, wherein transmitting the corrections to the second data processing system includes sending only the corrections along with a predefined text string which indicates that this is a corrected message of the previously sent instant message and is used by the second data processing system to determine whether to discontinue the alert.

9. The method of claim 1, wherein activating the correction operation includes at least one of receiving an input from an operated correction key on a keyboard and receiving an input from a correction button on a pointing device.

10. The method of claim 4, wherein when the second data processing system receives the corrected version of the previously sent instant message, the corrected version is displayed in a message log portion of a graphical user interface on the second data processing system.

11. The method of claim 10, wherein the corrected version of the previously sent instant message is displayed with an indicator indicating that the corrected version of the previously sent instant message is a corrected instant message, wherein the corrected version is a copy of the previously sent instant message with some portions of the corrected version being changed from what previously existed in the previously sent instant message to reflect the corrections that were made to the previously sent instant message.

12. The method of claim 10, wherein the corrected version of the previously sent instant message is displayed in place of the previously sent instant message in the message log portion of the graphical user interface.

13. The method of claim 1, further comprising:
    storing a transcript of an instant messaging session between the first data processing system and the second data processing system, wherein the transcript includes instant messages which were not corrected during the session and corrected versions of instant messages that were corrected during the session.

14. A computer program product stored on a computer readable medium for correcting a previously sent instant message, comprising:

first instructions for activating a correction operation in a first data processing system including instructions for selecting the previously sent instant message from a message log and instructions, responsive to selection of one of a physical and a virtual control, for initiating correction of the selected previously sent instant message by opening a newly displayed correction window on a graphical user interface provided by the first data processing system, wherein the correction window has the selected previously sent instant message from the message log automatically displayed in the correction window for subsequent correction by a user of the first data processing system;

second instructions, responsive to the first instructions, for automatically sending a notification command to a second data processing system that was a recipient of the previously sent instant message indicating that correction of the previously sent instant message is in progress;

third instructions for receiving corrections to the previously sent instant message in the newly displayed correction window; and fourth instructions for transmitting the corrections to the second data processing system.

15. The computer program product of claim 14, further comprising:

fifth instructions for receiving, by the second data processing system, the notification command indicating that the user of the first data processing system is currently correcting the previously sent instant message; and sixth instructions for generating, by the second data processing system, a notification that alerts another user of the second data processing system that the user of the first data processing system is currently correcting the previously sent instant message, wherein when the second data processing system receives the corrections, the alert is discontinued.

16. The computer program product of claim 15, wherein the notification includes at least one of textual output, graphical output, and audio output.

17. The computer program product of claim 14, wherein the fourth instructions for transmitting the corrections to the second data processing system include instructions for transmitting a corrected version of the previously sent instant message that includes the corrections depicted in a different manner from non-corrected portions of the previously sent instant message.

18. The computer program product of claim 15, wherein the fourth instructions for transmitting the corrections to the second data processing system include instructions for sending only the corrections along with a predefined text string which indicates that this is a corrected message of the previously sent instant message and is used by the second data processing system to determine whether to discontinue the alert.

19. An apparatus for correcting a previously sent message, comprising:

means for activating a correction operation in a first data processing system including means for selecting the previously sent message from a message log and means, responsive to selection of one of a physical and a virtual control, for initiating correction of the selected previously sent message by opening a newly displayed correction window on a graphical user interface provided by the first data processing system, wherein the correction window has the selected previously sent message from the message log automatically displayed in the correction window for subsequent correction by a user of the first data processing system;

means, responsive to the means for activating, for automatically sending a notification command to a second data processing system that was a recipient of the previously sent message indicating that correction of the previously sent message is in progress;

means for receiving corrections to the previously sent message in the newly displayed correction window; and means for transmitting the corrections to the second data processing system.

20. A method for receiving instant messages by a second data processing system, comprising steps performed by the second data processing system of:

receiving an instant message from a first data processing system;

receiving a notification command indicating that a user of the first data processing system is correcting the received instant message;

generating a notification that alerts another user of the second data processing system that the user of the first data processing system is correcting the instant message;

receiving a corrected version of the instant message after the notification command has been received and after the notification has been generated; and displaying the corrected version on a graphical user interface of the second data processing system.

21. The method of claim 20, wherein when the second data processing system receives the corrected version of the instant message, the corrected version is displayed in a message log portion of graphical user interface gf the second data processing system.

22. The method of claim 21, wherein the corrected version of the instant message is displayed with an indicator indicating that the corrected version of the instant message is a corrected message.

23. The method of claim 21, wherein the corrected version of the instant message is displayed in place of the received message in the message log portion of the graphical user interface.

24. The method of claim 20, wherein the notification includes at least one of textual output, graphical output, and audio output.

25. A computer program product stored on a computer readable medium for receiving instant messages, comprising:

first instructions for receiving an instant message from a first data processing system in a second data processing system;

second instructions for receiving a notification command indicating that a user of the first data processing system is correcting the received instant message;

third instructions for generating a notification that alerts a user of the second data processing system that the user of the first data processing system is correcting the instant message;

fourth instructions for receiving a corrected version of the instant message after the notification command has been received and after the notification has been generated; and fifth instructions for displaying the corrected version on a graphical user interface of the second data processing system.

26. The computer program product of claim 25, wherein when the second data processing system receives the corrected version of the instant message, the corrected version is displayed in a message log portion of the graphical user interface of the second data processing system.

27. The computer program product of claim 26, wherein the corrected version of the instant message is displayed with an indicator indicating that the corrected version of the instant message is a corrected message.

28. The computer program product of claim 26, wherein the corrected version of the instant message is displayed in place of the received message in the message log portion of the graphical user interface.

29. The computer program product of claim 25, wherein the notification includes at least one of textual output, graphical output, and audio output.

30. An apparatus for receiving instant messages, comprising:
    means for receiving an instant message from a first data processing system in a second data processing system;
    means for receiving a notification command indicating that a user of the first data processing system is correcting the received instant message;
    means for generating a notification that alerts a user of the second data processing system that the user of the first data processing system is correcting the instant message;
    means for receiving a corrected version of the instant message after the notification command has been received and after the notification has been generated; and
    means for displaying the corrected version on a graphical user interface of the second data processing system.

* * * * *